United States Patent Office 2,802,484
Patented Aug. 13, 1957

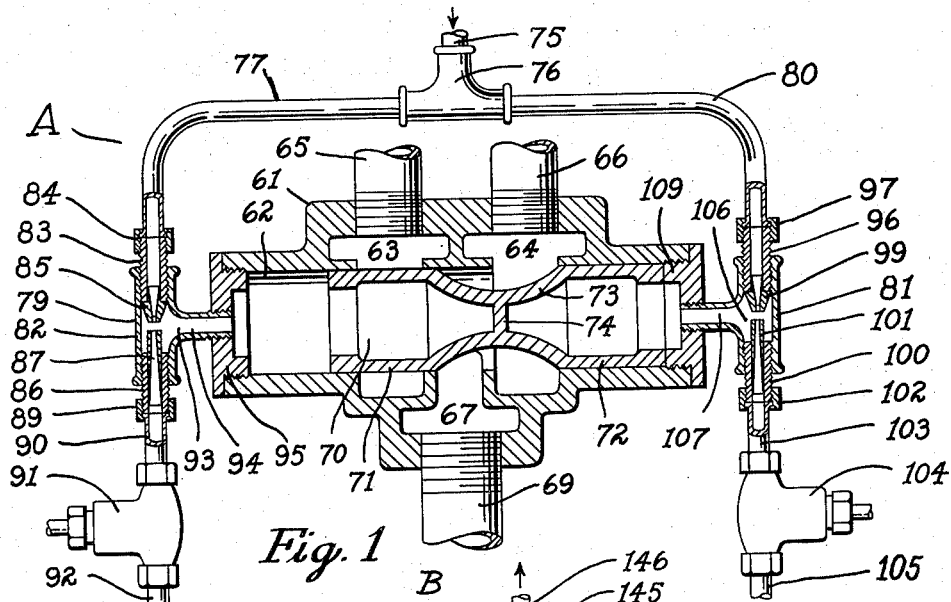

2,802,484

FLUID OPERATED SYSTEMS

Herman E. Sheets, Akron, Ohio

Substituted for abandoned application Serial No. 607,823, July 30, 1945. This application August 12, 1952, Serial No. 303,957

13 Claims. (Cl. 137—625.4)

My invention relates to an improvement in fluid operated systems which may be used for providing a pneumatic or hydraulic control system or the like.

Fluid motors have been constructed which comprise a cylinder having a slidable piston therein and means for introducing fluid into at least one end of the cylinder for moving the piston. Movement of the piston in the opposite direction may be effected either by spring means or by a reverse application of fluid in the opposite end of the cylinder.

It is the object of the present invention to increase the effectiveness and the efficiency of such fluid motors by incorporating an ejector or equivalent device in the fluid line leading to the fluid motor. It will be evident that the incorporation of such an ejector device will result in new and novel features in the operation of such fluid motors which were heretofore considered impossible.

I have found that by incorporating an ejector in the fluid line leading to the cylinder and by providing a valve in series with the ejector, the fluid motor may be rendered much more effective. The valve mechanism is so arranged that when the piston is to move in one direction fluid pressure will be introduced through the ejector into the cylinder. In such an operation the ejector is of no utility as it does not operate as an ejector during the flow of fluid through the ejector into the cylinder. When it is desired to move the piston in the opposite direction the valve means are actuated to open the flow of fluid through the ejector to the exhaust. The flow of fluid through the ejector creates a partial vacuum or low pressure in the suction room of the ejector, tending to reduce below normal the pressure in the cylinder. As a result the end of the cylinder to which the ejector is connected may be quickly evacuated and reduced to a pressure below normal. The evacuation of the cylinder end may actuate the piston in a reverse direction. This reverse movement may if desired be supplemented by spring means or by fluid pressure on the opposite side of the piston.

In double acting fluid motor systems, a similar arrangement can be made. In such an instance, an ejector is connected to each end of the cylinder, and a fluid line through the ejector extends from a source of fluid supply to the exhaust. Valve means are provided in each fluid system to permit fluid to flow through the ejector to create a partial vacuum in the suction room thereof, or to permit fluid under pressure to flow into the adjacent end of the cylinder. Obviously when one side of the cylinder is subjected to partial vacuum and the other side of the cylinder is subjected to fluid pressure a considerable pressure differential is provided between the cylinder ends.

A feature of the present invention lies in the use of my fluid motor for proportioning the flow of fluid from two or more sources to a single outlet. For example, my fluid motor is extremely useful in proportioning the flow of hot and cold water to a common outlet. A valve may be provided in each fluid line and these valves may be thermostatically controlled. When the temperature of the outlet liquid drops below a predetermined temperature, one of the valves may be momentarily actuated to open the valve. The opening of either valve will create a partial vacuum in the cylinder end connected to the fluid line containing the valve, causing a movement of the piston toward that end of the cylinder. Such movement may be used to increase the amount of hot water and to decrease the amount of cold water passing into the outlet. Similarly should the temperature at the outlet raise above a predetermined amount, the opposite valve may be thermostatically operated to permit a flow of fluid through the valve, thus creating a partial vacuum in the adjacent cylinder end providing a movement of the piston toward that end of the cylinder. This movement of the piston may serve to allow more cold water to enter the valve and to reduce the supply of hot water entering the same.

The foregoing description is merely an example of the manner in which my fluid motor may be used to control a proportioning valve. In place of the arrangement described, a single acting piston may be employed which may or may not be spring loaded in one direction.

A feature of the present invention lies in the fact that the speed of operation of the fluid motor may be effectively controlled by suitable controlling means used in series with the ejector. The speed of operation of the fluid motor may be regulated by controlling the flow of fluid into or from the fluid motor.

An additional feature of the present invention rests in the fact that fluid motors may act as a proportioning means for maintaining fluid at a constant predetermined ratio. The fluid is supplied to a fluid motor through two inlet conduits and leaves the fluid motor through a suitable mixed outlet conduit. The proportioning of each of the two inlet fluids may be regulated by pilot valves in series with ejector means, this type of proportioning means being extremely sensitive and readily controllable.

This application is a substitute for abandoned application 607,823 filed July 30, 1945.

In the drawings forming a part of my specification:

Figure 1 is a cross sectional view through a typical proportioning device showing one form of construction thereof wherein the piston is double acting.

Figure 2 illustrates a double acting cylinder showing the manner in which the piston may be selectively operated, first in one direction and then in the other.

Figure 3 shows a modified form of proportioning device in which the actuated cylinder is of the single acting type.

Figure 4 is a view similar to Figure 3 showing the use of a spring to augment the action of the ejector.

In Figure 1 of the drawings I disclose a proportioning device construction designated in general by the letter A. This construction comprises a body 61 which includes an elongated cylinder 62 and substantially ring-shaped intake ports 63 and 64. An inlet pipe 65 is connected to the intake port 63 while the pipe 66 is in communication with the intake port 64. Opposite of the intake ports 64 and 63 I provide an outlet port 67 in communication with the outlet pipe 69.

For convenience in the description, the proportioning device A will be described as a mixing device for proportioning hot and cold water. This is only illustrative of one use of the device and it is obvious that other liquids for other purposes can be similarly proportioned. In the present instance, however, it may be considered that the pipe 65 forms an inlet pipe for hot water, while the pipe 66 forms an inlet pipe for cold water. The mixture of hot and cold water is discharged through the pipe 69.

An elongated hollow piston 70 is slidably located between the ends of the cylinder 62. The piston 70 includes spaced ends 71 and 72 which are of proper diameter to fit snugly within the cylinder 62. The central portion of the piston 70 between the ends 71 and 72 may preferably be reduced in diameter as indicated at 73, and a partition wall 74 separates the ends of the piston.

The end 71 of the piston 70 is of sufficient length to entirely cover the intake port 63 when the piston 70 is in the right hand position illustrated in the drawings, the reduced diameter portion 73 acting to connect the intake port 64 with the outlet port 67. In the opposite extreme position of the piston 70 the end 72 of the piston is of sufficient length to entirely close the inlet port 64, the reducing diameter portion 73 of the piston forming the connection between the intake port 63 and the outlet port 67. At intermediate positions of the piston 70 the intake ports 63 and 64 may be more or less opened. When the piston is at the right hand position illustrated in the drawings the port 64 will be opened and the port 63 is closed. When the piston 70 is in center position, both ports 63 and 64 will be approximately half way open. As the piston 70 moves further to the left the opening to the port 63 will increase, simultaneously decreasing the opening to the port 64. Thus the liquid entering through the pipes 65 and 66 may be properly mixed and allowed to leave the valve body through the outlet pipe 69.

In order to move the piston 70 I provide a fluid supply pipe 75 which is connected to a suitable source of fluid supply and which leads to the T connection 76. One branch of the T 76 is connected by the pipe 77 to the inlet end of the ejector 79, as will be later described. The other branch of the T is connected by the conduit 80 to the inlet end of the ejector 81.

The ejector 79 includes a T-shaped body 82 having an inlet nipple 83 threadably engaged in one end thereof. A clamping nut 84 holds the end of the pipe or conduit 77 to the nipple 83. An inlet nozzle 85 is engaged in the nipple 83 through which fluid is directed from the inlet pipe 75.

An outlet nipple 86 is threadably engaged in the outlet end of the body 82 and an outlet nozzle 87 is engaged in the nipple 86. A nut 89 on the nipple 86 connects this nipple to a pipe 90 which leads to the control valve 91. The control valve 91 is connected to an outlet pipe 92 and acts to control the flow of fluid from the ejector 79. The suction room 93 of the ejector 79 is connected by the branch 94 of the ejector body to the end 95 of the cylinder 62.

The ejector 81 includes a nipple 96 secured in the inlet end thereof, which is fastened by a clamping nut 97 to the pipe 80. An inlet nozzle 99 is secured in the nipple 96 through which the incoming fluid must flow.

A nipple 100 is engaged in the outlet end of the ejector 81 and an outlet nozzle 101 is engaged in this nipple. A clamping nut 102 secures the nipple 100 to the conduit 103 which leads to a control valve 104 connected to a suitable discharge pipe 105. The suction room 106 of the ejector 81 is connected by the branch 107 of the T-shaped body of the ejector to the end 109 of the cylinder 62.

In the operation of the system A, the fluid flows into the pipe 75 and is transmitted by the conduits 77 and 80 to the ejectors 79 and 81. If the valve 91 is closed the fluid under pressure will fill the suction room 93 and be transmitted through the branch 94 of the ejector body to the left hand end of the cylinder 62. The fluid pressure has a tendency to move the piston 70 to the right or to maintain the piston in this position.

If the valve 91 is opened the fluid will pass from the pipe 77 through the inlet nozzle 85 and out through the outlet nozzle 87 of the ejector 79, thus creating a reduced pressure in the suction room 93 which is in communication with the left hand end of the cylinder 62. This reduction in pressure at this end of the cylinder has a tendency to move the piston 70 to the left from the position illustrated in Figure 1.

Similarly when the valve 104 is closed the fluid flows through the inlet nozzle 99 filling the suction room 106 and passing through the connection 107 to the right hand end of the cylinder 62, tending to urge the piston 70 to the left from the position shown in Figure 1. Upon the opening of the valve 104 the fluid may flow directly from the inlet nozzle 99 to the outlet nozzle 101, reducing the pressure in the suction room 106 and tending to evacuate fluid therefrom. This reduced pressure will be communicated through the connection 107 to the right hand end of the cylinder 62, tending to move the piston 70 to the right or to hold the piston in this position as shown in Figure 1. When both valves 91 and 104 are closed the piston remains in any set position and will not move. Thus it is possible to get a fixed and constant proportioning ratio.

In the operation of the proportioning device the valves 91 and 104 may be so operated by a control device, such as a thermostat, not shown in the drawings, that one valve closes as the other valve is opened. Thus when pressure tending to move the piston in one direction is exerted against one end of the cylinder the other end of the cylinder may be under reduced pressure due to the other of the ejectors. Thus the ejectors assist in the efficient operation of the proportioning device.

In the system B, illustrated in Figure 2 of the drawings, I provide a cylinder 130 having a double acting piston 131 which is connected in any suitable manner, as by nuts 128, to a piston rod 132. This rod 132 passes through a packing joint 133 in the ends 134 and 153 of the cylinder 130 and may be used for any useful purpose. The fluid supply to the cylinder enters through the intake pipe 135 which is connected to a T connection 136. One branch of the T 136 is connected by the pipe 137 to the inlet end of the ejector device 139. The outlet end of the ejector device 139 is connected by the pipe 140 to the valve port 141 of the three way valve 142. The rotor or valve member 143 of the three way valve 142 is provided with a passage 144 therethrough which may provide a communicating passage between the port 141 and the valve port 145 which is connected to the outlet pipe 146.

The other branch of the T 136 is connected by a pipe 147 to the inlet end of an ejector device 149. A pipe 150 connects the outlet of the ejector device to the port 151 of the valve 142. When the passage 144 through the valve member 143 is connecting the outlet pipe 140 to the pipe 146 the port 151 is closed by the valve member 143. However, in another position the valve member 143 may connect the ports 145 and 151 so that fluid may flow from the pipe 150 through the passage 144 in the valve member 143 to the outlet pipe 146. In this case the valve member 143 closes the port 141.

The suction room of the ejector device 139 is connected by the pipe 152 to the cylinder 130 near the end 153 thereof. The pipe or connection 154 connects the suction room of the ejector device 149 to the cylinder 130 near the end 134 thereof. Either of the pipes 152 or 154 may transmit low pressure or high pressure to the cylinder 130.

In the operation of the system B, fluid enters the inlet pipe 135 and flows through the T 136 and into the inlet of the ejector device 139. As the outlet of this ejector device is connected to the exhaust, fluid will flow through the pipe 140, the passage 144 and the outlet pipe 146. A reduced pressure is then experienced in the suction room of the ejector device 139, this reduced pressure being communicated to the left hand end of the cylinder 130 through the pipe 152. A reduced pressure then exists to the left of the piston 131, tending to draw this piston toward the left into the position shown in the drawings.

The fluid under pressure simultaneously passes through the pipe 147 to the inlet of the ejector device 149. As the outlet 150 is closed by the valve member 143 the fluid under pressure fills the suction room of the ejector device 149 and is transmitted through the pipe 154 to the right hand end of the cylinder 130. Therefore a condition is reached wherein pressure is being reduced in the left hand end of the cylinder 130 due to the action of the ejector 139, while the full pressure of the fluid is being introduced into the other end of the cylinder 130. The piston 131 will obviously be moved to the left into the position shown in Figure 2.

If the valve member 143 is turned so that neither the pipe 140 nor the pipe 150 is in communication with the outlet pipe 146, the inlet pressure will be transmitted to both ends of the cylinder 130. Equal pressure will then be transmitted to both sides of the piston 131, holding the piston stationary. However, when the valve member is turned so that the passage connects the port 151 to the outlet port 145, fluid may then be forced from the inlet pipe 135 through the pipe 147, through the inlet and outlet of the ejector device 149, through the pipe 150, and through the valve member 143 to the outlet pipe 146. This action causes a reduction in pressure in the suction room of the ejector device 149 which is transmitted by the pipe 154 to the right hand end of the cylinder 130. Simultaneously, fluid pressure is applied to the left end of the cylinder due to the closing of the outlet of the ejector device 139 by the valve member 143. Fluid from the inlet 135 is transmitted through the inlet of the ejector device 139 and the pipe 152 to the left hand end of the cylinder 130. As a result the piston 131 is moved to the right.

In Figure 3 of the drawings I disclose a proportioning device which is operated by a hydraulic system at one end only of the cylinder. The system C shown in Figure 3 includes a hydraulic cylinder 155 having a pair of spaced inlets 157 and 156 thereto. A pair of pistons 159 and 160 connected by a connecting rod 161 are slidable in the cylinder 155. A central outlet 162 is provided in the cylinder 155 between the pistons 159 and 160.

The piston 159 is spaced from the piston 160 so that when the piston 160 is located at the end 163 of the cylinder 155 the piston 159 will close the inlet 156. The piston 160 is arranged with respect to the piston 158 so that when this piston 159 is against the end 164 of the cylinder 155 the inlet 157 will be closed by the piston 160. The pistons 159 and 160 are of such width as to entirely close the respective inlets while at an intermediate position of the pistons both of the inlets will be open a corresponding amount. As the double piston device moves to the right from center position, the inlet 156 will close and the inlet 157 will open. As the double piston moves to the left from center position the inlet 156 will open and the inlet 157 will close. Thus any proportion of fluids from the inlets may be mixed and may leave the cylinder 155 through the outlet 162.

In order to operate the pistons I provide a source of fluid supply which is connected by a pipe 165 to a regulating valve 166, which in turn is connected by a pipe 167 to the inlet of the ejector device 169. The outlet of this device is connected by a pipe 170 to the regulating valve 171, which in turn is connected by the pipe 172 to the valve 173. This valve 173 is connected to a suitable outlet 174. The suction room of the ejector device 169 is connected by a pipe 175 to the end 163 of the cylinder 155.

In operation fluid enters through the inlet 165 to the ejector device 169. If the valve 173 is closed the fluid pressure will be transmitted to the suction room of the ejector device and through the pipe 175 to the right hand end of the cylinder 155 urging the pistons to the left. However, when the valve 173 is opened and fluid pressure passes directly through the ejector device 169, creating a reduced pressure in the suction room thereof, which is communicated through the pipe 175 to the right hand end of the piston 160 tending to move this piston to the right as viewed in Figure 3. The speed of movement of the pistons 159 and 160 may be regulated by the regulating valves 166 and 171. The pistons 159 and 160 may be held in any adjusted position by closing the valve 166 and either the valve 171 or 173, when an incompressible fluid is used to operate this proportioning device. It may thus be seen that the piston may be moved in either direction by operation of the ejector 169. A piston ring 176 is preferably provided on the piston 160 so as to seal the right hand end of the cylinder from the area between the pistons.

In Figure 4 of the drawings I disclose a system D which is similar to the system C in most respects, but which includes the use of a spring for urging the pistons in one direction. In this system I provide a cylinder 177 having spaced inlets 179 and 180 thereto. A central outlet 181 is provided through which the mixture of liquids may flow after being mixed in the cylinder 180. A pair of pistons 182 and 183 are provided in the cylinder 177 connected by a connecting rod 184. The piston 182 is so spaced from the piston 183 that when the piston 183 is located at the end wall 185 of the cylinder 177, the piston 182 will be in position to close the inlet 179. Similarly when the piston 182 is located at the cylinder end wall 186 the piston 183 will be closing the inlet 180. A spring 187 is provided to urge the pistons 182 and 183 toward the end 185 of the cylinder.

In order to operate the pistons I provide a source of fluid supply connected by the pipe 189 to the control valve 190. This valve is connected by a pipe 191 to the inlet of an ejector device 192, the outlet of which is connected by a pipe 193 to a valve 194. The outlet of the valve 194 is connected to a suitable outlet pipe 195. The suction room of the ejector device 192 is connected by a pipe 196 to the end 185 of the cylinder 177. A piston ring 197 is preferably provided on the piston 183 to seal this piston with respect to the cylinder.

In the operation of the system D, fluid flows from the fluid supply through the valve 190 to the inlet of the ejector device 192. If the valve 194 is in closed position the fluid under pressure is transmitted through the pipe 196 to the right hand end of the cylinder 177, urging the piston 183 to the left and compressing the spring 187. This movement will tend to open the inlet 179 and to close the inlet 180 to a more or less degree depending upon the extent of movement of the pistons. When the valve 194 is open the fluid from the fluid supply can pass directly through the ejector 192 to the outlet pipe 195, thus causing a reduced pressure in the ejector device 192 which is transmitted through the pipe 196 to the right hand end of the cylinder 177. This will cause movement of the pistons 182 and 183 to the right, acting to open the inlet 180 and to close the inlet 179 to a greater or lesser degree.

The speed of operation of the pistons or other movable members of the fluid motor in question within the various systems depends to some extent upon the pressure with which the fluid is supplied and the nature of the fluid used to operate the same. The operation is also materially affected by the efficiency of the particular ejector used. If a quick movement of the piston is desired a more efficient ejector should be used, or in some cases the viscosity of the operating fluid may be lowered to render a given ejector more efficient. Obviously under similar pressure, size, and temperature conditions the fluid with a low viscosity and within the range of high Reynolds numbers, such as a gas, will require only a relatively inefficient ejector to produce the necessary pressure difference in the cylinder. Similarly a fluid with a lower Reynolds number such as a liquid will require an ejector of higher efficiency. Various types of ejectors have been constructed, each of which may be advantageous for a particular purpose.

Any suitable ejectors may be used in any of the systems described, depending upon the work to be done, and upon the fluid to be used. It is necessary to use an ejector sufficiently effective and efficient to accomplish the task with the particular fluid to be used and from the various ejectors may be selected one type which is sufficiently efficient.

In accordance with the patent statutes, I have described the principles of construction and operation of my improved fluid operated systems, and while I have endeavored to set forth the best embodiments thereof, I desire to have it understood that obvious changes may be made within the scope of the following claims without departing from the spirit of my invention.

I claim:

1. A fluid system including in combination a fluid supply source, a cylinder, a piston in said cylinder, ejector means connected to each end of said cylinder to control the pressure on opposite sides of said piston, said ejector means being connected to said supply source, an outlet passage connected to each ejector means, and valve means in each said outlet passage in downstream series with said ejectors controlling the flow of fluid through said outlet passage connected to each of said ejector means.

2. A fluid system including in combination a fluid supply source, a proportioning device comprising a cylinder having a pair of inlets thereto and an outlet therefrom, and a piston device operable in said cylinder to proportion the flow of fluid from said inlets to said outlet, and means for operating said piston device including ejector means connected to each end of said cylinder to control the pressure within said cylinder at either end of said piston device, means connecting said ejector means to said fluid supply source, and valve means connected to the outlet of each ejector means controlling the flow of fluid through said ejector means, independent opening of each valve means actuating said piston device in one direction.

3. A fluid system including in combination a fluid supply source, a proportioning device comprising a cylinder having a pair of inlets thereto and an outlet therefrom, and a piston device operable in said cylinder to more or less open either inlet while simultaneously closing the other inlet, and means for operating said piston device comprising ejector means connected to each end of said cylinder to control the pressure on either end of said piston device, and valve means connected to the outlet of each ejector means controlling the flow of fluid through said ejector means, independent operation of each valve means causing a flow of fluid through its ejector actuating said piston device in one direction.

4. A fluid system including in combination a fluid supply source, a proportioning device comprising a cylinder having a pair of inlets thereto and an outlet therefrom, and a piston device operable in said cylinder to proportion the flow of fluid from said inlets to said outlet, and means for operating said piston device including ejector means connected to one end of said cylinder to control the pressure within said cylinder at the corresponding end of said piston device, means connecting said ejector means to said fluid supply source, and valve means connected to the outlet of said ejector means in series therewith controlling the flow of fluid through said ejector means, opening of said valve means actuating said piston device in one direction.

5. An independent fluid pilot system for controlling and proportioning separate and independent liquid flows through a plurality of mixer valve passageways including in combination a fluid supply source, a cylinder, a reciprocal piston variably adjustable to stationary intermediate position between its limits of reciprocation in said cylinder when operated upon by fluid flow from said independent fluid source in independent relationship to the liquid flowing through the mixer valve passageways, ejector means in said independent fluid pilot system connected to one end of said cylinder to control variations of pressure on opposite sides of said piston, said ejector means being connected by a conduit means to said independent supply source, an outlet passage connected to the ejector means in said independent fluid system, and adjustable valve means in said outlet passage in series with said ejector means for regulating and controlling the flow of fluid from said supply source through said outlet passage connected to said ejector means exclusive of the liquid passing through said mixer valve passageways.

6. An independent fluid control system including in combination a separate pressurized fluid supply source, a cylinder, a variably adjustable piston in said cylinder adjustable to different and intermediate positions when operated upon by fluid flow from said separate pressurized fluid supply source, control elements associated with said piston and variably adjustable thereby, ejector means in said fluid system connected to one end of said cylinder to control the pressure on opposite sides of said piston, said ejector means being connected by conduit means to said separate supply source, and outlet fluid passage connected to the ejector means in said fluid system, and adjustable valve means in said outlet passage in series with said ejector means for regulating and controlling the flow of fluid from said separate supply source through said outlet passage connected to said ejector means.

7. A fluid control system including in combination a cylinder, a reciprocable variably adjustable piston movable within the cylinder, an associated element controlled by said piston, a separate fluid supply source in independent relationship to the element controlled by said piston, ejector means including an inlet nozzle, an outlet nozzle and an intermediate take-off nipple having communication with the adjacent ends of said nozzles and one end of said cylinder, a fluid supply conduit connected to said inlet nozzle from said separate fluid supply source, a fluid outlet conduit connected to said outlet nozzle in independent relationship to the element controlled by said piston, and an adjustable valve connected to said outlet nozzle in series relationship therewith for controlling continuous flow of fluid from said fluid supply source through said ejector means to vary and stop the said piston at selective points intermediate the limits of its reciprocal motion.

8. The structure described in claim 5 and including a second ejector means connected to the other end of the cylinder, said second ejector means including an inlet and an outlet, said inlet thereof being connected to said supply source and said outlet thereof having a valve connected thereto to control the flow through said second ejector means from said fluid supply source.

9. The structure described in claim 7 and including a second ejector means connected to the other end of the cylinder, said second ejector means including an inlet and an outlet, said inlet thereof being connected to said supply source and said outlet thereof having a valve connected thereto to control the flow through said second ejector means from said fluid supply source.

10. The structure of claim 5 and including a means engageable with said piston normally biasing the same toward said one end of said cylinder.

11. The structure of claim 7 and including a means engageable with said piston normally biasing the same toward said one end of said cylinder.

12. The structure of claim 5 and including a second valve in said conduit between said ejector and said fluid supply source.

13. The structure of claim 7 and including a second valve in said conduit between said ejector and said fluid supply source.

References Cited in the file of this patent

UNITED STATES PATENTS

| | | |
|---|---|---|
| 962,111 | Assmann | June 21, 1910 |
| 2,009,102 | Bern | July 23, 1935 |
| 2,074,882 | Wunsch | Mar. 23, 1937 |
| 2,099,563 | Henning | Nov. 16, 1937 |
| 2,313,822 | Hapgood | Mar. 16, 1943 |
| 2,354,791 | Boldt | Aug. 1, 1944 |

FOREIGN PATENTS

| | | |
|---|---|---|
| 381,757 | Germany | Sept. 24, 1923 |